United States Patent [19]
Schuster et al.

[11] Patent Number: 6,151,636
[45] Date of Patent: Nov. 21, 2000

[54] DATA AND MEDIA COMMUNICATION THROUGH A LOSSY CHANNEL USING SIGNAL CONVERSION

[75] Inventors: Guido M. Schuster, Des Plaines; Jerry Mahler, Prospect Heights; Ikhlaq Sidhu, Buffalo Grove; Michael Borella, Naperville, all of Ill.

[73] Assignee: 3Com Corporation, Santa Clara, Calif.

[21] Appl. No.: 09/018,872

[22] Filed: Feb. 5, 1998

Related U.S. Application Data

[63] Continuation-in-part of application No. 08/993,505, Dec. 18, 1997, which is a continuation-in-part of application No. 08/989,616, Dec. 12, 1997, which is a continuation-in-part of application No. 08/989,483, Dec. 12, 1997, Pat. No. 5,870,412.

[51] Int. Cl.[7] .................................................... G06F 5/00
[52] U.S. Cl. ........................................... 709/247; 709/231
[58] Field of Search ................................. 709/231, 233, 709/234, 247; 710/70

[56] References Cited

U.S. PATENT DOCUMENTS

| | | | |
|---|---|---|---|
| 5,115,436 | 5/1992 | McAuley. | |
| 5,608,738 | 3/1997 | Matsushita. | |
| 5,638,363 | 6/1997 | Gittins et al. ............................. | 370/358 |
| 5,926,477 | 7/1999 | Shirokura et al. ....................... | 370/395 |

OTHER PUBLICATIONS

McAuley, Anthony J., "Reliable Broadband Communication Using A Burst Erasure Correcting Code", Bellcore Computer Communication Research Group (1990), pp. 297–306.

Nonnenmacher, Jorg et al., "Parity–Based Loss Recovery for Reliable Multicast Transmission" (1997), pp. 289–300.

Schuster, Guido M., "A Video Compression Scheme with Optimal Bit Allocation Among Segmentation, Motion and Residual Error", Chapter 2: Review of lossy video compression, Northwestern University, Department of Electrical Engineering and Computer Science, Evanston, Illinois (Jun. 1996).

"ITU–T Recommendation H.263", Video coding for low bit rate communication, International Telecommunication Union (Mar. 1996).

*Primary Examiner*—Dung C. Dinh
*Attorney, Agent, or Firm*—McDonnell Boehnen Hulbert & Berghoff

[57] ABSTRACT

A method and apparatus for improving the speed and quality of end-to-end data or real-time media transmissions over an internet is disclosed. A data stream representing a media signal at a given level of compression is processed just before the data stream enters the internet. A less compressed data stream representing the same media signal is generated transmitted through the internet. Due to the lower level of compression, the underlying media signal is less sensitive to packet loss in the internet and, as a result, the media signal that arrives at the receiving end will tend to be more continuous and clear.

37 Claims, 3 Drawing Sheets

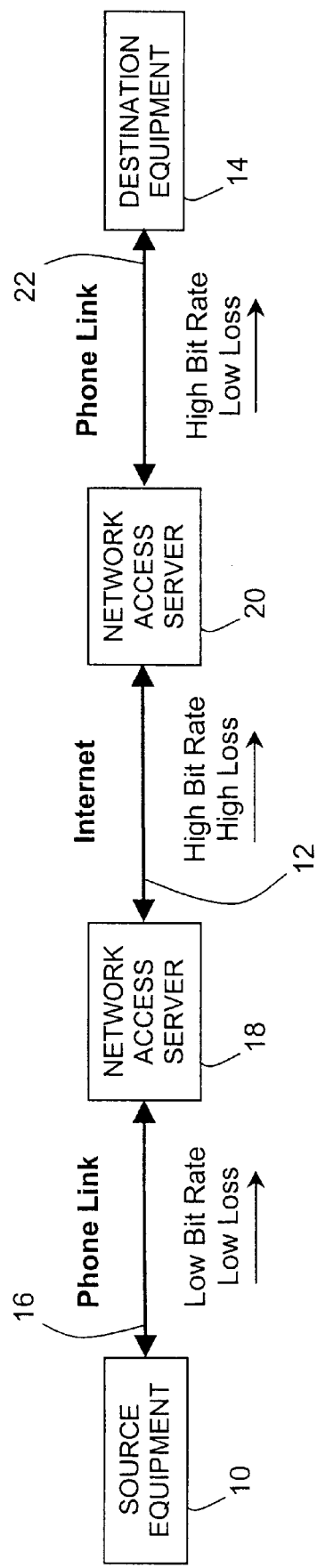

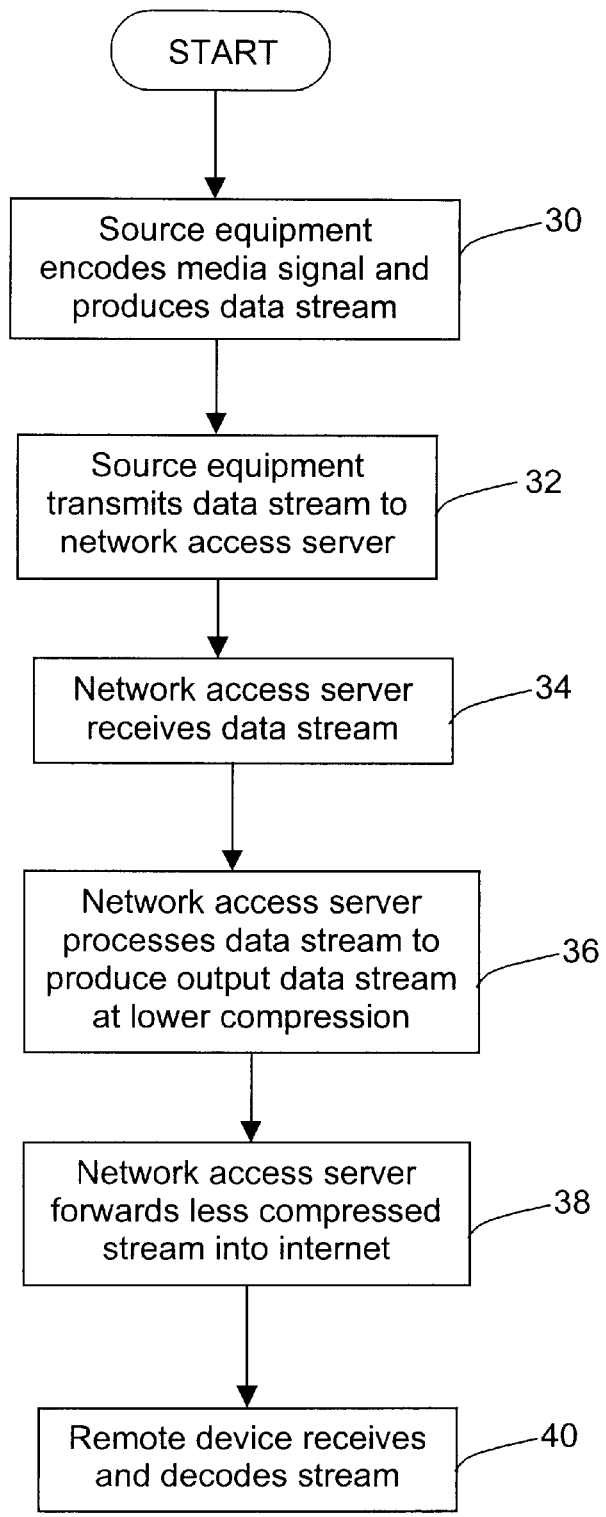

DATA AND MEDIA COMMUNICATION THROUGH A LOSSY CHANNEL USING SIGNAL CONVERSION

RELATED APPLICATIONS

The present application is a continuation-in-part of (i) two U.S. patent applications Ser. Nos. 08/989,616 and 08/989,483 now U.S. Pat. No. 5,870,412, each entitled "A Forward Error Correction System for Packet Based Real Time Media," and each filed Dec. 12, 1997, by the present inventors and assigned to the owner of the present invention, and (ii) U.S. patent application Ser. No. 08/993,505 entitled "Data and Real-Time Media Communication Over a Lossy Network," filed Dec. 18, 1997, by the present inventors and assigned to the owner of the present invention. The disclosures of these applications are expressly incorporated herein by reference.

BACKGROUND OF THE INVENTION

1. Field of the Invention

The present invention relates to telecommunications systems and more particularly to a method and apparatus for improving the speed and quality of data communications through a packet switched network. The invention is particularly useful for enhancing the communication of real-time media signals, such as audio and video, through a congested and lossy network such as the Internet.

2. Description of the Related Art

The Internet is a world-wide network of computers and computer networks of a configuration well known to those in the art. The Internet operates according to a set of standard protocols known as Transmission Control Protocol/Internet Protocol (TCP/IP). Each protocol in the TCP/IP suite is designed to establish communication between common layers on two machines, or hosts, in the network. The lowest layer in the Internet is the "physical" layer, which is concerned with ensuring that actual bits and bytes of information pass along physical links between nodes of the network. The next layer is the "network" or "IP" layer, which is concerned with permitting hosts to inject packets of data into the network to be routed independently to a specified destination. The next layer in turn is the "transport" layer, which is concerned with allowing peer entities on source and destination hosts to carry on a conversation.

The transport layer of TCP/IP includes two end-to-end protocols, TCP (Transmission Control Protocol) and UDP (User Datagram Protocol). TCP is a reliable connection-oriented protocol, which includes intelligence necessary to confirm successful transmission between the sending and receiving ends in the network. UDP, in contrast, is an unreliable connectionless protocol, which facilitates sending and receiving of packets but does not include any intelligence to establish that a packet successfully reached its destination. In general, UDP is used by applications that do not want TCP's sequencing or flow control but wish to provide their own.

According to the TCP/IP model, the TCP transport layer takes a data stream to be transmitted and breaks it up into independent connectionless segments or "datagrams." TCP adds to each of these packages a 20 byte header, which includes overhead information such as a source port number, a destination port number and a sequence number designed to allow the receiving end to properly reassemble the datagrams into the original message. The transport layer then "passes" each of these packages to the IP layer.

The IP layer in turn adds another header to each package, providing additional overhead information, such as a source IP address and a destination IP address. The IP layer then transmits the resulting packages through the Internet, possibly fragmenting each package into pieces or as it goes. As the pieces of the package finally reach the destination machine, they are reassembled by the IP layer and passed to the transport layer. The transport layer then inserts the original datagrams in proper sequence in an effort to reconstruct the original data stream for use by the receiving process and ultimately by an end user.

As a computer network, the Internet thus serves to provide communication between two nodes, such as a local subscriber computer/modem (which might be referred to as the "source" equipment) and a remote computer/modem (which might be referred to as the "destination" equipment), for example. In practice, the source equipment packetizes a stream of useful data and adds to each packet the header information required by TCP/IP for transmission over the Internet. The source then forwards a sequence of these packets via a communications link to a network access server (often in the form of a "hub" or "router") at the edge of the Internet.

The communications link from the source equipment to the network access server may take any of a variety of forms. As an example, if the source equipment is a connected to the public switched telephone network (PSTN), the communications link may consist of an unshielded twisted pair (UTP) of copper wires extending from the subscriber's modem to a telephone company central office, and then a T1 line extending from the central office to the network access server. As another example, if the source equipment is connected to a local area network (LAN), the communications link may consist of the LAN and then a transmission line extending from the LAN to the network access server. In that case, the source equipment may even have its own Internet address (IP address). Nevertheless, the source equipment should still be viewed as being connected "to" the Internet via a communications link, as it is connected via that link to a network access server at the edge of the Internet. In any event, this communications link is generally reliable, in the sense that little if any perceptible loss will result to data being carried by the link.

At the edge of the Internet, the network access server receives the incoming stream of data packets provided by the source and routes the packets onto the Internet for transmission to a remote location, or other edge, of the Internet. This network access server is commonly owned by an Internet Service Provider (ISP) organization. Due to the growing demand for Internet access, a network access server usually contains a plurality of modems or other circuitry arranged to simultaneously receive and process multiple incoming calls. In addition, the network access server often includes or is connected to a gateway, sometimes in the form of a discrete processor, for forwarding the packets onto the Internet. Of course, the network access server may take other forms as well, generally serving the function of passing data between the Internet and some external communications link (even if that external communications link is an offshoot of the Internet).

Ideally, the packets transmitted into the Internet by the network access server should arrive successfully at a remote edge of the Internet and pass to the specified destination equipment. Generally, similar to the source equipment as described above, the destination equipment is connected via a communications link to a network access server at the remote edge of the Internet. This communication link may be of the same or a different type than that used to connect the source equipment. In any event, the destination equipment should ideally receive the transmitted IP packets, extract the payload from the packets and reconstruct an ordered data stream for use by a remote subscriber.

Unfortunately, deficiencies in the existing communication infrastructure have precluded the successful widespread transmission of real time media signals, such as digitized voice, audio and video, from end-to-end over the Internet. The principle reasons for this lack of success have been a limited bit rate in the communications link and, in turn, signal distortion that arises from a high rate of packet loss and delay in the Internet.

First, the conventional telephone circuit that is often used to carry packets between the source equipment and the network access server is limited in bit rate. In particular, according to Shannon's Law, which is well known in the art, the bit rate or capacity C in a transmission line having a bandwidth B and a signal-to-noise ratio SNR is defined as the product of B and $\log_2(1+\text{SNR})$. While the quality of transmission along a conventional telephone line may vary, the line typically has a bandwidth of about 3 kHz and a signal-to-noise ratio of about 30 dB. With these values, the line would be limited to a bit rate of about 30 kbps.

In an effort to work with this bit rate limitation, the telecommunications industry has recognized that Internet users (and other modem users) are more likely to download complex media signals (such as audio and video clips) from the Internet than to upload such signals to the Internet. Consequently, many modems today apportion the available telephone line capacity between upstream communication (away from the subscriber modem) and downstream communication (toward the subscriber modem). These modems include, for example, the U.S. Robotics Sportster 56K Faxmodem, and the U.S. Robotics Sportster 56K Winmodem, both manufactured by 3Com Corporation, of Santa Clara, Calif.

Commonly, for instance, by employing advanced digital coding techniques, modems may allocate a bit rate of 56 kbps to downstream transmission and a bit rate of only 33.6 kbps to upstream transmission. Alternatively, other protocols such as ADSL (asymmetric digital subscriber line) provide for different bit rate allocations between the upstream and downstream channels in the telephone link.

Due to the limited bit rate available for upstream transmission on the conventional telephone link, real-time media services such as digitized voice and video need to be highly compressed or "source coded" in order to be transmitted to the Internet. Typically, the source equipment performs this compression according to one of many well known coding schemes, such as G.723.1, H.261 and H.263 (as recommended by the International Telecommunications Union), for example. As those skilled in the art appreciate, however, the more a media stream is compressed, the more sensitive it becomes to distortion from packet loss, because each packet of the stream represents more information about the underlying signal.

In turn, as known in the art, the Internet itself (generally extending from network access server to network access server) suffers from a high rate of packet loss and resulting transmission delays. In particular, depending on conditions such as how congested the Internet is at any given time, loss of entire packets has been found to occur on the Internet at a rate of up to 25%, or up to one in every four packets. Typically, this packet loss occurs one packet at a time, which should not perceptibly distort a real-time audio signal, but may perceptibly distort a real-time video signal, and would certainly distort a pure data signal such as an e-mail message. Often, however, burst errors occur on the Internet and result in the loss of multiple sequential packets in a row. Unlike the sporadic loss of a single packet, if left uncorrected, these burst errors can and will substantially and perceptibly distort almost any transmitted signal.

The connection-oriented TCP protocol provides a mechanism for responding to packet loss in the Internet. According to TCP, when a segment arrives at the destination, the receiving TCP entity should send back to the sending entity a segment bearing an acknowledgement number equal to the next sequence number that it expects to receive. If the sending entity does not receive an acknowledgement within a specified time period, it will re-transmit the package of data.

Generally speaking, this acknowledgment and re-transmission system works well to correct packet loss in the Internet. However, the system can unfortunately delay the complete transmission of a data stream. For the transmission of packets representing pure data signals such as e-mail messages, transmission delay is not ideal, although it is of secondary concern compared to an unrecoverable loss of information. Real-time media signals (especially compressed signals), however, are by definition highly sensitive to delay and will appear jumpy, interrupted or otherwise distorted if parts of the signal do not flow continuously to the receiving end. Therefore, although the loss of packets in a real time media transmission over the Internet has been correctable, the resulting signals have often nevertheless been of unacceptable quality.

As the foregoing illustrates, the existing structure and methods for communication of data and real time media signals over the Internet have proved to be deficient. In view of the existing deficiencies, a need therefore exists for an improved mechanism to provide better quality and quicker end-to-end communications over the Internet or other lossy network.

SUMMARY OF THE INVENTION

The present invention is a method and apparatus for providing improved end-to-end transmission of data or real-time media signals through a lossy network such as the Internet. The invention stems from the realization that the upstream communications link to the network access server provides a highly reliable and low bit-rate channel (e.g., a conventional telephone circuit), while the bi-directional Internet link provides an unreliable and high bit-rate channel, and the remote downstream link to the destination modem also provides a highly reliable and high bit-rate channel. A signal passing from end-to-end in this configuration may therefore flow, in order, through the following three physical links:

(1) Low bit rate, highly reliable communications link;

(2) High bit rate, lossy Internet; and (3) High bit rate, highly reliable communications link.

Conveniently, from the point where this transmission path begins to be lossy (i.e., from the start of the "Internet," where packet loss begins to be likely), a high bit rate is available for transmission. The present invention takes advantage of this high bit rate.

As indicated above, the more a real-time media stream is compressed, the more sensitive it will be to packet loss. Conversely, the less a real-time media stream is compressed, the less sensitive it will be to packet loss. To achieve improved performance in end-to-end transmission of real-time media signals over the Internet, the present invention therefore calls for decompressing or expanding the upstream data signal at the edge of the Internet and transmitting the more robust version of the signal into the lossy network. Although the decompressed signal may require greater bit rate capacity for transmission, the Internet is presumably capable of handling this higher bit rate. Further, although packets will still be lost in the Internet, each lost packet of the decompressed or expanded signal will represent less information about the underlying signal. Consequently the distortion resulting from the loss of such packets (for instance, in the form of delay caused by retransmission requests) will be reduced.

According to one arrangement, for instance, the network access server at the edge of the Internet receives a compressed media stream from the source equipment and processes the stream to produce a less compressed and more robust output stream. This processing may involve completely decoding the media stream and then re-encoding the media with less compression. Alternatively, if the coded stream contains sufficient information, the process may employ fast algorithms that only partially decode the stream to obtain information needed to derive a less compressed output stream. The network access server then forwards the resulting output stream into the lossy Internet for transmission to a remote network access server and in turn to the destination equipment.

The network access server preferably codes the output stream according to the same coding standard as the incoming stream. In this regard, multi-media coding standards often include variable parameters that allow a media stream to be coded with different resulting levels of compression. According to the present invention, the network access server may vary those parameters or may modify the underlying media signal to derive a less compressed media stream, while maintaining the same coding standard. In this way, the signal conversion contemplated by the present invention can be transparent to both the source and destination equipment, both of which expect to be communicating according to a predefined standard.

The foregoing as well as other aspects and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described herein with reference to the drawings, in which:

FIG. 1 is a block diagram illustrating an example of a configuration in which the present invention may be implemented;

FIG. 2 is a table indicating the capacity and reliability of various physical links in the example configuration shown in FIG. 1;

FIG. 3 provides an overview of the process steps performed in a transmission system according to a preferred embodiment of the present invention.

DETAILED DESCRIPTION OF THE PREFERRED AND ALTERNATIVE EMBODIMENTS

Figure 4:
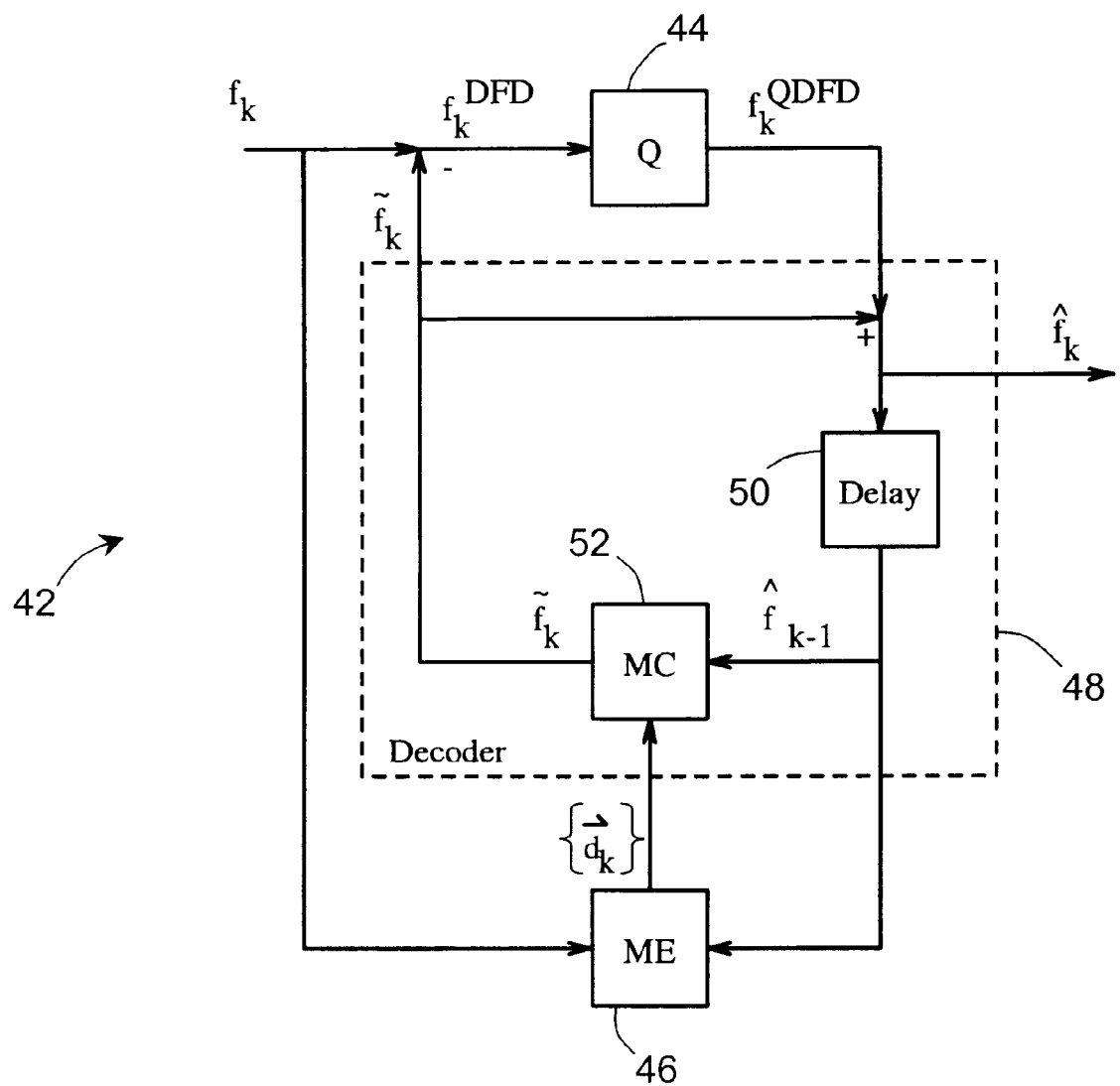
FIG. 4 illustrates a generic motion compensation waveform encoder forming the basis for existing video coding standards.

Referring to FIG. 1, the present invention may be implemented in a communication system in which source equipment 10 wishes to establish end-to-end communication of data over an internet 12 with destination equipment 14. Internet 12 is preferably a packet switched wide area network (WAN) or a combination of large computer networks joined together over high-speed data links. An example of one such computer network is the "Internet" (capital "I"), which is described in the above background section. However, internet 12 may equally be another wide or local area network.

As illustrated by FIG. 1, in one example configuration, internet 12 provides a high bit rate, high loss transmission channel. For instance, internet 12 may be assumed to provide a bit rate of 56 kbps in any direction. In addition, for purposes of this example, internet 12 may be assumed to suffer from a packet loss rate of up to 25% when congested.

Typically, source equipment 10 includes a personal computer that generates digital data and transmits the data to a modem, which in turn modulates the data for transmission. However, source 10 may alternatively be some other device capable of sending and/or receiving data signals. In one common configuration, for instance, source equipment 10 may be device (such as a server or a personal computer or other terminal, for example) that sits on a local area network (LAN) interconnected to internet 12. Still alternatively or additionally, source equipment 10 may be any device that has a network address within internet 12. Destination equipment 14 also typically includes a modem and computer. However, destination equipment 14 as well may alternatively be some other communication device, such as a device that sits on a LAN and/or has an address within internet 12.

Source and destination equipment 12, 14 may alternatively be referred to, respectively, by terms such as a local user device and a remote user device, or a first user device and a second user device. Alternatively, from the perspective of internet 12, the source or destination equipment may be viewed simply as remote terminals.

Source equipment 10 is interconnected to a network access server 18 at the edge of internet 12 via a communications link. As described in the above background section, the communications link may take any of a variety of forms including, for example, a telephone circuit or a computer network. For purposes of the present description, and without limitation, the communications link will be assumed to be a conventional telephone circuit or telephone link 16. In a common configuration as noted above, however, the communications link may alternatively be a LAN or other network interconnected via a transmission line to the edge of internet 12. Still more generally, the communications link may be any wired or wireless communications path including, for example, copper wire, fiber optic, T1, ISDN, cellular, microwave or satellite links.

Telephone circuit 16 provides bi-directional communication between source 10 and network access server 18. For reference in this description, communication of data in the direction from source 10 to network access server 18 will be referred to as "upstream," because the source is sending data "up" to the network. Similarly, communication of data from network access server 18 to source 10 will be referred to as "downstream," because data is flowing "down" to the source from the network. It will be appreciated, however, that these references may change depending on the perspective of an observer.

For reasons discussed above, telephone circuit 16 typically provides highly reliable (low loss) asymmetric communication channels, with a low bit rate allocated to the upstream transmission channel and a high bit rate allocated to the downstream transmission channel. For purposes of example in this description, the upstream channel provided by telephone circuit 16 may be assumed to be limited to 33.6 kbps and the downstream channel may be assumed to be limited to 56 kbps. It should be appreciated, however, that the invention is not restricted to use in connection with this or other asymmetric channel allocations but may even extend to use in connection with a symmetric telephone circuit 16. In that case, for purposes of example in this description, telephone circuit 16 could be assumed to provide a low bit rate of 33.6 kbps in each direction.

Network access server 18 provides connectivity between internet 12 and source 10 via telephone link 16. Network access server 18 preferably includes a line interface circuit that operates to connect the network access server to telephone circuit 16 and a network interface circuit that operates to connect the network access server to internet 12. Additionally, network access server 18 typically includes one or more modems and/or computer processors, together with memory, interconnected via a bus with the line interface and configured to process data that flows between link 16 and internet 12.

An example of a network access server suitable for use in the present invention is described in U.S. Pat. No. 5,528,595 (Walsh et al.), which is entitled "Modem Input/Output Signal Processing Techniques," and which issued on Jun. 18, 1996 to U.S. Robotics, Inc. Such a device has been commercialized widely by 3Com Corporation (previously U.S. Robotics Corp.) under the designation Total Control™ Enterprise Network Hub. Network access servers similar in functionality, architecture and design are also available from other companies, including Ascend Communications, Livingston Enterprises, Multitech, and others. The present invention is suitable for implementation, at least in part, in network access servers from these companies.

Typically, destination equipment 14 is also interconnected to a network access server 20 at some remote edge of internet 12 via a communications link 22. Like the link extending between source equipment 10 and network access server 18, this communications link may take any of a variety of forms such as those described above. For purposes of example in this description, however, and without limitation, communications link 22 will be assumed to be a conventional telephone circuit 22. Similarly, network access server 20 may, for example, be similar in configuration to network access server 18.

From the foregoing, it is evident in this example that a signal flowing from source 10 to destination 14 will pass through three physical links: (i) the upstream channel of telephone circuit 16, (ii) the internet 12 and (iii) the downstream channel of telephone circuit 22. These three links are summarized by a table set forth in FIG. 2. In terms of bit rate, the signal first passes through a low bit rate link (the upstream telephone circuit) and then, upon reaching the internet 12, passes through one or two high bit rate links (the internet and possibly the downstream telephone circuit). In terms of packet loss, the signal first passes through a highly reliable link (the upstream telephone circuit), then through an unreliable link (the internet), and then possibly through another highly reliable link (the downstream telephone circuit).

The preferred embodiment of the present invention is concerned with the transmission of real-time media signals through the existing communication infrastructure. Generally speaking, real-time media signals may be digitized and may fall into two categories, audio and video. Examples of audio signals include music and voice. Examples of video signals include still and moving images as well as other graphics. Of course, the present invention is not limited to use in connection with the transmission of these specific types of signals but equally extends to the transmission of other signals as well, such as pure data signals (e.g., e-mail messages).

As real-time media signals pass through the existing transmission system, they become degraded due to bit rate limitations and packet loss. Most significantly, as described above, internet 12 (and particularly the Internet, for example) suffers from a high rate of packet loss of up to 25%, especially during times of congestion. As discussed above, this packet loss is particularly problematic for compressed media streams, because each packet in a compressed media stream represents more information about the underlying media signal. Although the TCP protocol may help to recover from this packet loss through its retransmission scheme, the underlying media information will be delayed from reaching the receiving end, which will therefore result in signal distortion.

The present invention provides for improved end-to-end transmission of media signals through internet 12 by decompressing or expanding the coded streams to make the streams less sensitive to packet loss. In the preferred embodiment, this transformation takes place just before the signal enters the lossy internet 12, for instance, at network access server 18. In some cases, decompressing or expanding the signal at this point may increase the bit rate required for transmission of the media stream. However, internet 12 is presumed to operate at sufficient bit rate to carry the additional information.

FIG. 3 provides an overview of the process steps performed in a transmission system according to a preferred embodiment of the present invention. Referring to FIG. 3, at step 30, source 10 encodes a media signal (such as digitized voice, audio or video, for example) using a given coding scheme (such as G.723.1 or H.263, for example) and thereby produces a data stream representing the media signal at a desired level of compression. At step 32, source 10 transmits this data stream along communications link 16 to network access server 18 for transmission on internet 12, and, at step 34, network access server 18 receives the data stream.

At step 36, network access server 18 processes the data stream to produce an output data stream that is coded with the given coding scheme but at a lower level of compression, thus rendering the signal less sensitive to packet loss. Because this processing involves changing a level of compression of the signal, it may conveniently be referred to as "recompression" processing. At step 38, network access server 18 forwards this more robust, recompressed output data stream onto internet 12, destined for receipt by a remote device such as destination equipment 14. Finally, at step 40, the remote device receives and decodes the data stream to recover the underlying media signal.

The recompression processing performed by network access server 18 at step 36 may of course depend on the particular standard according to which the media stream is coded. Typically, network access server 18 will know which standard is being used to encode the stream (for instance, as communicated to the network access server through a suitable signaling scheme), and the network access server will process the signal accordingly.

The recompression step may involve filly decoding the input media stream and re-encoding it to produce a less compressed (more robust) output stream. Alternatively, if the coding standard provides sufficient information in the coded stream, recompression step 36 may involve only partially decoding the input stream to obtain information sufficient to derive a less compressed output stream. In this regard, when a media stream is encoded, useful information is added to the signal, and this useful information may be conveniently retained during the recompression process. For instance, provided with an input video stream coded with motion vectors (as will be described more below), network access server 18 may retain the motion vector information for use in the output stream, rather than re-computing the same information.

Within a given coding standard, the present invention recognizes a trade-off between compression ratio of a media signal and robustness of the signal to packet loss. As indicated above, the more the signal is compressed, the less robust it will be to packet loss. On the other hand, the less the signal is compressed, the more robust it will be to packet loss. Considering this trade-off, recompression step 36 may properly take any of a variety of forms. For instance, and without limitation, the recompression step may fall within the following categories: (i) varying the representation of the media signal in the space domain, (ii) varying the representation of the media signal in the time domain, (iii) varying the representation of the media stream in the frequency domain, and (iv) varying the packetizing of the media stream. Several examples will help explain the operation of the present invention.

As a general example of recompression by varying the digital representation of the signal in the space domain, assume that the source equipment takes a video signal sampled at 10 frames per second and compresses the signal with a given coding scheme to flow at 32 kbps. Assume further that the compression scheme uses differential encoding, which senses the incremental changes or vectors between absolute points in the signal, rather than the absolute points themselves. Source 10 sends that compressed data stream along communications link 16 to network access server 18 for transmission in internet 12. If, as in the prior art, network access server 18 sends this data stream into internet 12 without modification, a loss of packets containing 6.4 kilobits of payload will be equivalent to the loss of 2 video frames.

According to the present invention, however, when network access server 18 receives this data stream, network access server 18 may process the stream to produce an output data stream representing the 10 frames/second signal at 64 kbps, for instance, rather than at 32 kbps. Network access server 18 may do so, for instance, by converting the stream to represent the absolute points of the media signal instead of using differential encoding. Since every frame of the output stream is thus represented by 6.4 kilobits, the loss of 6.4 kilobits of payload will correspond to the loss of only 1 video frame. Consequently, provided with this conversion, the signal is less likely to be distorted by packet loss in internet 12.

As a general example of recompression by varying the representation of the media signal in the time domain, assume that the source equipment provides the same 10 frames/second video signal described above, compressed to a data stream of 32 kbps. When network access server 18 receives this data stream, it may fully or partially decode the data stream to recover the underlying 10 frames/second video signal. Network access server 18 may then re-sample the video signal at only 5 frames/second and re-encode the stream according to the same standard, maintaining the bit rate of 32 kbps. As a result, since the resulting bit stream is less compressed, it is more robust (less sensitive) to packet loss in internet 12.

As a general example of recompression by varying the packetizing of the media stream, network access server 18 may divide almost any incoming data stream into smaller packets, each representing a smaller portion of the underlying media signal. For instance, assume that source 10 has coded a voice signal using the well known G.723.1 voice coding standard. By convention, the packets or "frames" of G.723.1 are transmitted within Real Time Protocol (RTP) packages. However, as is known in the art, the header of an RTP package is larger than the size of a single G.723.1 frame. Therefore, to be more efficient, source 10 will typically compress the stream by putting more than one G.723.1 frame in each RTP package.

According to the present invention, network access server 18 may process and expand this data stream by repackaging each G.723.1 frame in its own RTP package. The resulting output data stream may be significantly larger than the incoming data stream. However, it will be substantially more robust than the incoming data stream, because each RTP package will contain less information about the underlying signal. As a result, the loss of RTP packages in internet 12 will not have as much of a distorting effect on the voice signal being transmitted, and the signal heard at the receiving end should be much clearer.

It should be appreciated that dividing a data stream into smaller packets will apply as well in the context of coding schemes and protocols other than G.723.1. For instance, at a basic level, the example may apply to TCP datagrams. Even provided with TCP/IP packets carrying pure data signals (such as e-mail messages), network access server 18 may break the packets into smaller pieces, so that the output data stream becomes less sensitive to packet loss in internet 12.

The foregoing examples thus illustrate in general how the present invention can serve to render a media stream more robust for transmission in lossy internet 12. A more specific example, however, will help to better illustrate how the present invention may work in practice. For this example, consider a video signal encoded according to the well known H.263 video coding standard.

According to the H.263 standard, source 10 may convey a video frame to destination 14 by either providing information that actually represents the current frame or providing information that the receiving end can use to predict the current frame. By convention, each frame of the video signal is divided into a matrix of blocks. Information representing the frame itself is considered "intraframe" information (and information representing each block of the frame is considered "intrablock" information). On the other hand, information allowing the receiving end to predict the frame typically takes the form of "motion compensation" vector information.

Each H.263 frame may contain either "intra-" information or motion compensation information in order to convey a video signal. Further, to facilitate sending a video stream through motion compensation coding, H.263 also allows for "conditional replenishment," according to which, if the encoder determines that a given block has not changed sufficiently from the previous frame, the encoder may send a simple codeword to the decoder telling the decoder to maintain the previous block.

As known by those skilled in the art, intrablock information requires more bits to represent a video frame than does motion compensation information. Consequently, to save capacity for transmission along link 16, source 10 will often encode a video stream using motion compensation coding, rather than using intrablock information. Unfortunately, however, motion compensation coding can give rise to additional problems from packet loss in internet 12. Specifically, the loss of packets containing motion compensation vectors could result in the propagation of errors in the resulting video signal, which will continue until the signal is refreshed with a new intraframe.

To help explain this error propagation problem, FIG. 4 illustrates a generic motion compensation waveform encoder 42, which forms the basis for many existing video coding standards, such as H.261, H.263, MPEG-1 and MPEG-2. As shown in FIG. 4, encoder 42 includes a quantizer 44, a motion estimator 46, and a decoder portion 48. Decoder portion 48 in turn includes a frame delay 50 and a motion compensator 52. Decoder portion 48 is ideally the same decoder that destination equipment 14 employs to decode a video signal encoded by encoder 42. Therefore, the information that is provided to decoder portion 48 in the following description is the same information that source 10 would transmit to destination 14 in a video signal transmission system.

Encoder 42 receives a series of n video frames, $f_1$, $f_2$, $f_3$, ..., $f_n$, per unit time. As shown in FIG. 4, when encoder 42 receives frame $f_k$, the encoder subtracts from $f_k$ a value, $\tilde{f}$, that the encoder predicted for the current frame $f_k$ based on the previous frame, $f_{k-1}$ (as will be discussed more below). The difference between $f_k$ and $\tilde{f}_k$ is called the "displaced frame difference," $f_k^{DFD}$ or the "error." Encoder 42 then quantizes $f_k^{DFD}$ to produce $f_k^{QDFD}$. Through this quantization process, encoder 42 preferably discards information (such as high frequencies) that is not important to human perception.

Encoder 42 provides this quantized error, $f_k^{QDFD}$, to decoder portion 48 (and similarly source 10 transmits this information to destination 14). Within decoder portion 48, encoder 42 then adds to $f_k^{QDFD}$ its prediction of the current frame, $\tilde{f}_k$, to derive an estimate of the current frame, $\hat{f}_k$. The corresponding decoder at the receiving end will display this estimate, $\hat{f}_k$, as the current frame. This estimate, $\hat{f}_k$, should differ from the actual current frame $f_k$ only slightly, due to the quantization of the signal.

Through operation of frame delay 50, decoder portion 48 regularly stores in memory the estimate of the previos frame, $\hat{f}_{k-1}$. Decoder portion 48 then forwards $\hat{f}_{k-1}$ to motion estimator 46 of encoder 42 and also uses $\hat{f}_{k-1}$ to predict the next frame, provided with motion estimation information derived by motion estimator 46.

To derive motion estimation information, motion estimator 46 compares the current actual frame $f_k$ with the last frame (estimate) that was displayed, $\hat{f}_{k-1}$, and it determines how the elements of the picture moved from the last displayed frame to the current frame. Encoder 42 thereby generates for each block of the picture a displacement vector, $\overline{d}_k$, which indicates where in the previous frame the block came from. For a given frame, encoder 42 then provides these displacement vectors, $\{\overline{d}_k\}$, to motion compensator 52 of decoder portion 48 (and, similarly, source 10 transmits displacement vectors $\{\overline{d}_k\}$ to destination 14 for use in decoding).

Decoder portion 48 in turn performs motion compensation to derive a prediction of the current frame, $\tilde{f}_k$, based on movement from the previous frame. Specifically, motion compensator 52 applies displacement vectors, $\{\overline{d}_k\}$, to the estimate of the previous frame, $\hat{f}_{k-1}$. As a result, $\hat{f}_{k-1}$ becomes warped into $\tilde{f}_k$, which should look like the current frame. As those skilled in the art will appreciate, $\tilde{f}_k$ will generally look more like the current frame the less the encoder quantizes (compresses) the signal.

In summary, the source (encoder) 10 thus sends to the destination (decoder) 14 the quantized displacement frame difference, $f_k^{QDFD}$, as well as the displacement vectors, $\{\overline{d}_k\}$. Provided with this information, destination 14 should be able to reconstruct the transmitted image, although the image will need to be periodically refreshed.

Unfortunately, if the values of $f_k^{QDFD}$ or $\{\overline{d}_k\}$ are lost in transmission (for instance, due to packet loss in internet 12), encoder 42 may not know that those values were lost. However, the decoder at the receiving end may still receive the next displacement vectors and may responsively (and erroneously) move a block of the picture as directed by the respective displacement vector. As this error propagates over time, the decoder at destination 14 may continue to move the wrong block around the picture, as the decoder will be out of synch with the decoder portion 48 of encoder 42, until the encoder sends a new intraframe.

According to a preferred embodiment of the present invention, when network access server 18 receives a video stream coded with motion compensation information, network access server 18 may process the stream to remove the motion compensation and, instead, provide conditional replenishment information and intrablock information in the output stream. For a given block, if network access server 18 determines that a minimal image change has occurred between the previous block and the current block, network access server 18 may provide the simple "use previous block" codeword in the output stream. However, if network access server 18 determines that a significant image change has occurred (as represented by an error greater than some predetermined level), network access server 18 may provide a fresh version of the block in the form of intrablock information.

Understandably, by providing intrablock information rather than displacement information, the output data stream will require more bit capacity than was required for the input data stream. Advantageously, however, internet 12 is presumed to be capable of handling this increased bit rate. Further, by decompressing the media stream, the stream becomes less sensitive to packet loss in internet 12. In particular, by eliminating the use of motion compensation information before the signal enters lossy internet 12, the present invention removes a source of error propagation in the resulting video signal. Still further, this change may be entirely transparent to both the source and destination equipment, because the resulting stream can be coded according to the same standard as was used by source 10 to initially encode the signal (H.263 in this example).

According to a further aspect of the present invention, network access server 18 preferably converts from motion compensation information to intrablock and conditional replenishment information in only some of the H.263 frames. As known in the art, an H.263 encoder sends an initial intraframe ("I" frame) and then sends a series of predictive frame information ("P" frames). Typically, an H.263 encoder also sends a bi-directional frame ("B") frame between each "P" frame. The "B" frame serves to render the resulting video more smooth but otherwise does not add significant information to the signal. In the preferred embodiment of the invention, network access server 18 will transform motion compensation information to intrablock and conditional replenishment information only for "P" frames, not for "B" frames.

Still further, as noted above, recompression step 36 may involve fully decoding the input media stream and re-encoding it to produce a less compressed (more robust) output stream, or, alternatively, only partially decoding the input stream to obtain information sufficient to derive a less compressed output stream. In the present example, for instance, the invention contemplates either fully decoding the media stream and then re-encoding it with conditional replenishment and intrablock information, or only partially decoding the media stream and deriving intrablock information based on partially coded information.

To fully decode and then re-encode a video stream in this example, network access server 18 will, for example, perform the following process steps. First, network access server 18 will apply the displacement vectors $\{\bar{d}_k\}$ to the previous frame so as to predict the current frame $\hat{f}_k$. Next, network access server 18 will inversely quantize the displaced frame difference $f_k^{DFD}$ to compute discrete cosine transform (DCT) coefficients. Next, network access server 18 will compute the inverse DCT to obtain the error signal for current frame. Network access server 18 will then add that error to the predicted frame to derive the intrablock. Finally, network access server will take the DCT coefficients (representative of the intrablock), quantize them and send them in internet 12 to network access server 20 and in turn to destination equipment 14.

Alternatively, to recompress the media stream of this example through only partially decoding the stream, network access server 18 might operate on the stream in the DCT domain or in some other frequency domain. For instance, provided with the DCT coefficients of the previous image and the motion vectors, network access server 18 might derive the prediction of the current frame in the DCT domain. By adding the error coefficients in the DCT domain, network access server 18 can then in theory avoid converting to and from the DCT domain, which would save significant processing power.

As the foregoing illustrates, by decompressing or expanding a media stream just before it enters a lossy network such as internet 12, the present invention may render a media stream less sensitive to packet loss in internet 12. Consequently, the signal that ultimately arrives at the receiving end will tend to be more continuous and less distorted.

According to the preferred embodiment, the invention may be further enhanced by decompressing the media stream by an amount proportionate to the available bit rate of internet 12 compared to the upstream bit rate of communications link 16. For instance, if the upstream bit rate of communications link 16 is half the bit rate of internet 12, network access server 18 may expand the bit rate of the stream by a factor of two. If, however, the upstream bit rate of link 16 is one third the bit rate of internet 12, then network access server 18 may expand the stream by a factor of three. In this way, the invention can take fill advantage of the additional bit rate available in internet 12.

Further, signal conversion such as that described above as being performed by network access server 18 may instead (or additionally) be performed at another point. As an example, in the arrangement where source equipment 10 sits on a computer network (such as a LAN or WAN) that is in turn interconnected via a high capacity transmission line to network access server 18, the recompression function may be performed by a device (such as a server) on the network or transmission line. Typically, a LAN operates with a low loss rate and a high bit rate (contrasted with telephone link 16, for instance, which operates with a low loss rate and a low bit rate). Therefore, a LAN has the capacity to carry a less compressed signal in accordance with the present invention.

As another example, remote network access server 20 may additionally or alternatively perform signal conversion in accordance with the present invention. If, for instance, network access server 20 knows that destination equipment 14 is a light client (incapable of processing highly compressed signals), network access server 20 may decompress incoming media streams and pass the less compressed streams along communications link 22 to the destination. Again, this signal conversion would preferably maintain the same coding standard used to encode the incoming signal, so that the conversion would be transparent to destination 14. Beneficially, however, the invention would work to improve communication between the source equipment and destination equipment.

Still further, the signal conversion function contemplated by the present invention may involve signal compression rather than (or in addition to) signal decompression. For instance, if downstream communications link 22 is incapable of handling a high capacity signal, network access server 20 (or some other line element) may compress the media stream to flow at a bit rate suitable for link 22.

This modification may be extended so that network access server 20 may compress the media stream to the same bit rate and/or same form used for the signal as originally transmitted from source 10. For example, if network access server 18 decompressed a 64 kbps stream to flow at 32 kbps, network access server 20 may in turn re-compress the stream to flow at 64 kbps. With such an arrangement, it may be useful to establish intelligent communication between network access server 18 and network access server 20 so that the two devices know when to decompress and compress a signal. An example of establishing such communication is described in the co-pending application entitled "Data and Real-Time Media Communication Over a Lossy Network," the entirety of which has been expressly incorporated herein by reference.

In any event, the signal conversion process described above may be carried out by either programmable or dedicated hardware, software, or firmware in the respective transmission line element(s). Provided with the present description and a knowledge of applicable coding standards (if any), those of ordinary skill in the art will be able to design the necessary hardware or software enhancements without undue experimentation.

For instance, in order for network access server 18 to decompress a media stream, a set of machine language instructions may be loaded into a memory or other storage device in the network access server and executed by one or more computer processors in the device. Such processors may be located, for instance, in modems and/or a gateway card in the network access server. Alternatively, the signal conversion function may be encoded in a dedicated or programmable digital signal processing chip or other circuitry. Additionally, in the event an existing network access server is programmable, the functionality of the present invention may be added conveniently by reprogramming the device.

Preferred and alternative embodiments of the present invention have been illustrated and described. It will be understood, however, that changes and modifications may be made to the invention without deviating from its true spirit and scope, as defined by the following claims.

What is claimed is:

1. In a telecommunications system of the type including a computer network interconnected to a communications link via a first network access server, said communications link interconnecting source equipment to said first network access server, wherein said computer network is further interconnected to a remote communications link via a remote network access server, a transmission method comprising, in combination, the following steps:

at the first network access server, receiving via said communications link a first data stream representing at a first level of compression a media signal provided by said source equipment;

at the first network access server, processing said first data stream and generating a second data stream representing said media signal at a second level of compression less than said first level of compression;

at the first network access server, forwarding said second data stream in said computer network destined for receipt by a remote user;

at the remote network access server, said second data stream;

at the remote network access server, processing said second data stream and generating a third data stream representing said media signal at a third level of compression greater than said second level of compression; and at the remote network access server, forwarding said third data stream along a remote communications link to said remote user.

2. A transmission method as claimed in claim 1, wherein said third level of compression is greater than said second level of compression.

3. A transmission method as claimed in claim 1, wherein said third level of compression is about the same as said first level of compression.

4. A transmission method as claimed in claim 1, wherein said third level of compression is higher than said first level of compression.

5. A transmission method as claimed in claim 1, wherein said second data stream and said first data stream both represent said media signal according to the same coding standard.

6. In a telecommunications system of the type including, in sequence, a first communications link and a second communications link, the first communications link having a first risk of data loss, the second communications link having a second risk of data loss higher than the first risk of data loss, wherein a media signal encoded at a first level of compression is transmitted along the first communications link, the improvement comprising, in order:

receiving the media signal from the first communications link;

transcoding the media signal so that the media signal is encoded at a second level of compression less than the first level of compression, whereby the media signal encoded at the second level of compression will be more resilient to data loss than the media signal encoded at the first level of compression; and transmitting the media signal along the second communications link.

7. A data transmission method comprising, in order:

receiving from a first communications link a first data stream destined for a remote location, the first data stream representing a media signal at a first level of compression, the first communications link having a first risk of data loss;

converting the first data stream into a second data stream representing the media signal at a second level of compression, the second level of compression being less than the first level of compression, whereby the media signal represented by the second data stream at the second level of compression is less sensitive to data loss than the media signal represented by the first data stream at the first level of compression; and transmitting the second data stream into a communications network having a second risk of data loss higher than the first risk of data loss, whereby the media signal remains destined for receipt at the remote location.

8. In a telecommunications system of the type including a computer network interconnected to a first communications link via a first network access server, said first communications link interconnecting source equipment to said first network access server, a transmission method comprising, in combination, the following steps:

(A) at said first network access server, (i) receiving via said first communications link a first data stream representing at a first level of compression a media signal provided by said source equipment, (ii) processing said first data stream and generating a second data stream representing said media signal at a second level of compression less than said first level of compression, and (iii) forwarding said second data stream in said computer network destined for receipt by a remote user; and (B) at a receiving location, (i) receiving said second data stream, (ii) processing said second data stream and generating a third data stream representing said media signal at a third level of compression greater than said second level of compression, and (iii) forwarding said third data stream, for receipt of the media signal by said remote user.

9. A method as claimed in claim 8, wherein the receiving location comprises a second network access server interconnected to a second communications link, and wherein forwarding said third data stream for receipt of the media signal by said remote user comprises transmitting the third data stream along the second communications link.

10. A method as claimed in claim 8, wherein the first communications link has a first risk of data loss, and the communications network has a second risk of data loss higher than the first risk of data loss, but whereby the media signal as represented by the second data stream at the second level of compression higher than the first level of compression is more resilient to data loss than is the media signal as represented by the first data stream.

11. A transmission method as claimed in claim 8, wherein said first data stream and said second data stream both represent said media signal according to the same coding standard.

12. A transmission method as claimed in claim 8, wherein said first data stream and said third data stream both represent said media signal according to the same coding standard.

13. A transmission method as claimed in claim 8, wherein said third level of compression is about the same as said first level of compression.

14. A transmission method as claimed in claim 8, wherein said computer network is an internet.

15. A transmission method as claimed in claim 8, wherein said computer network is the Internet.

16. A transmission method as claimed in claim 8, wherein processing said first data stream and generating said second data stream comprises varying a representation of said media signal in the time domain.

17. A transmission method as claimed in claim 8, wherein processing said first data stream and generating said second data stream comprises varying a representation of said media signal in the space domain.

18. A transmission method as claimed in claim 8, wherein processing said first data stream and generating said second data stream comprises varying a representation of said media signal in the frequency domain.

19. A transmission method as claimed in claim 8, wherein processing said first data stream and generating said second data stream comprises varying packetization.

20. A transmission method as claimed in claim 8, wherein said first data stream represents a video signal encoded with motion compensation coding, and said second data stream represents said video signal encoded with conditional replenishment and intrablock information.

21. A transmission method as claimed in claim 20, wherein both said first data stream and said second data stream are encoded according to the H.263 standard.

22. A transmission method as claimed in claim 8, wherein said media signal is selected from the group consisting of audio and video.

23. A transmission method as claimed in claim 22, wherein said media signal comprises a digitized voice signal.

24. A transmission method as claimed in claim 22, wherein said media signal comprises a video signal.

25. In a network access server providing connectivity between a computer network and a terminal interconnected to said network access server via a communications link, said communications link having a first risk of data loss, said computer network having a second risk of data loss greater than the first risk of data loss, said network access server comprising, in combination, (i) a line interface operatively connecting said network access server to said communications link, (ii) a modem, (iii) a bus passing data signals between said line interface and said modem, and (iv) a network interface receiving data from said modem and routing said data onto said computer network and receiving data from said computer network and routing said data to said modem;

the improvement comprising:

said line interface receiving via said communications link a first data stream representing at a first level of compression a media signal provided by said remote terminal;

a first set of machine language instructions stored in a memory and executed by said network access server for processing said first data stream and generating a second data stream representing said media signal at a second level of compression less than said first level of compression; and said network interface forwarding said second data stream onto said computer network destined for receipt by a remote terminal.

26. The improvement as claimed in claim 25, wherein said first data stream and said second data stream both represent said media signal according to the same coding standard.

27. The improvement as claimed in claim 25, wherein said computer network is an internet.

28. The improvement as claimed in claim 25, wherein said computer network is the Internet.

29. The improvement as claimed in claim 25, wherein processing said first data stream and generating said second data stream comprises varying a representation of said media signal in the time domain.

30. The improvement as claimed in claim 25, wherein processing said first data stream and generating said second data stream comprises varying a representation of said media signal in the space domain.

31. The improvement as claimed in claim 25, wherein processing said first data stream and generating said second data stream comprises varying a representation of said media signal in the frequency domain.

32. The improvement as claimed in claim 25, wherein processing said first data stream and generating said second data stream comprises varying packetization.

33. The improvement as claimed in claim 25, wherein said first data stream represents a video signal encoded with motion compensation coding, and said second data stream represents said video signal encoded with conditional replenishment and intrablock information.

34. The improvement as claimed in claim 33, wherein both said first data stream and said second data stream are encoded according to the H.263 standard.

35. The improvement as claimed in claim 25, wherein said media signal is selected from the group consisting of audio and video.

36. The improvement as claimed in claim 35, wherein said media signal comprises a digitized voice signal.

37. The improvement as claimed in claim 35, wherein said media signal comprises a video signal.

\* \* \* \* \*